US012117712B2

United States Patent
Muranaka et al.

(10) Patent No.: US 12,117,712 B2
(45) Date of Patent: Oct. 15, 2024

(54) 1 × N OPTICAL SWITCH

(71) Applicant: Nippon Telegraph and Telephone Corporation, Tokyo (JP)

(72) Inventors: Yusuke Muranaka, Musashino (JP);
Tatsushi Nakahara, Musashino (JP);
Toshikazu Hashimoto, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 175 days.

(21) Appl. No.: 17/769,553

(22) PCT Filed: Oct. 18, 2019

(86) PCT No.: PCT/JP2019/041104
§ 371 (c)(1),
(2) Date: Apr. 15, 2022

(87) PCT Pub. No.: WO2021/075047
PCT Pub. Date: Apr. 22, 2021

(65) Prior Publication Data
US 2023/0194952 A1    Jun. 22, 2023

(51) Int. Cl.
*G02F 1/313* (2006.01)
*G02F 1/035* (2006.01)
*G02F 1/21* (2006.01)

(52) U.S. Cl.
CPC ............ *G02F 1/3136* (2013.01); *G02F 1/035* (2013.01); *G02F 1/212* (2021.01); *G02F 1/3138* (2013.01)

(58) Field of Classification Search
CPC ........ G02F 1/035; G02F 1/212; G02F 1/3136; G02F 1/3138
See application file for complete search history.

(56) References Cited

U.S. PATENT DOCUMENTS

| | | | | |
|---|---|---|---|---|
| 5,892,864 A | * | 4/1999 | Stoll | G02F 1/313 385/40 |
| 2004/0086220 A1 | | 5/2004 | Mino et al. | |
| 2023/0095427 A1 | * | 3/2023 | Muranaka | G02B 6/12 385/9 |

FOREIGN PATENT DOCUMENTS

| | | |
|---|---|---|
| JP | 2004-177515 A | 6/2004 |
| JP | 2013-27085 A | 2/2013 |

(Continued)

OTHER PUBLICATIONS

Toshio Watanabe et al., *Silica-Based PLC 1 x 128 Thermo-Optic Switch*, 27th European Conference on Optical Communication (ECOC01), Sep. 30, 2001, pp. 134-135.

*Primary Examiner* — Daniel Petkovsek
(74) *Attorney, Agent, or Firm* — Workman Nydegger

(57) ABSTRACT

An optical switch is provided which is capable of driving control by the same FPGA and the same driving circuit configuration, and hence is capable of driving at a high speed and a low consumption power. The optical switch of the present disclosure is a 1×N optical switch having a structure in which with respect to an optical switch, a driving circuit of the optical switch is integrated in the vicinity of a control electrode of the optical switch. The optical switch includes a plurality of 2×2 optical switches and N optical gates. Different bias voltages ($V_b$) are set between the optical switches and the optical gates, and a driver for the 2×2 optical switch of the driving circuit and a driver for the optical gate are of the same circuit form.

14 Claims, 10 Drawing Sheets

(56) References Cited

FOREIGN PATENT DOCUMENTS

| JP | 2016-218297 A | 12/2016 |
| JP | 2016-224588 A | 12/2016 |

\* cited by examiner

1 X N OPTICAL SWITCH

TECHNICAL FIELD

The present disclosure relates to an optical switch element of an important optical component for supporting a large capacity optical communication network.

BACKGROUND ART

In recent years, with an advance of various network services, the communication traffic has been rapidly increasing. Expansion of the transmission capacity due to the wavelength multiplexing technology, and a study of the phase modulation and the multi-level modulation high in bandwidth utilization efficiency have proceeded, so that higher-level various large capacity optical signals have been transferred on an optical communication network.

A network includes a plurality of links and nodes. For each of these, research and development have been performed for high-speed and large-capacity communication. For the link, an increase in speed of a signal and multiplexing of wavelengths have been proceeding. On the other hand, for the node, the technology of flexibly changing the path for establishing a connection between the nodes has been regarded as important in order to implement an efficient traffic. In the case of a general network in which at the input end of a node, optical/electric conversion is performed, and switching is performed in an electric signal state, and at the output end of the node, again, electric/optical conversion is performed, and the signal is transmitted through an link, various problems such as occurrence of delay and consumption of enormous electric power are caused against buffering for performing optical/electric conversion. Under such circumstances, various transferring methods have been studied as the node technologies. The optical switching technology not requiring the optical/electric conversion is the technology effective in power consumption and delay of network equipment, and the like. An optical transmission system mainly composed of the optical switching technology has been actively studied.

Research and development have been conducted on a Thermo-optics (TO) switch configured on a Planar Lightwave Circuit (PLC), a switch using an InP type electro-absorption modulator (EAM), a Mach-Zehnder interferometer (MZI), or a Semiconductor Optical Amplifier (SOA), a phase modulator type switch of a $LiNbO_3$ system as such optical switches. As the example configured on a PLC, the optical switch shown in NPL 1 is proposed. FIG. 1 shows a main configuration example of an optical switch 100. The N×N optical switch can be configured by connecting, for example, N 1×N optical switches $101_N$ (N is a natural number) and N×1 optical switches 102N (N is a natural number) as shown in FIG. 1. The optical signal input from an optical input port $PI_N$ (N is a natural number) is output toward the N×1 optical switch connected to a desirable optical output port $PO_N$ (N is a natural number) by the 1×N optical switch element $101_N$. As a result, it is possible to implement a non-blocking type N×N optical switch 100 capable of given connection not depending upon the connection states of other ports.

As an optical switch using a compound semiconductor material, a method is proposed in which 2×2 optical switches $201_N$ (N is a natural number) are arranged in a tree shape as illustrated in FIG. 2, and an optical gate is provided at each of N optical outputs. The input signal light input from the optical output port $PI_N$ (N is a natural number) is waveguided to the desirable optical output port $PO_N$ (N is a natural number) by switching among the optical paths of the 2×2 optical switches. On the other hand, the crosstalk light leaked out to other ports is blocked by the optical gates, thereby implementing switching. For the 2×2 optical switches $201_N$ (N is a natural number), a MZI or the like is used, and for the optical gates $202_N$ (N is a natural number), an EAM, a SOA, or the like is used.

Normally, when an electric field applying type optical device is driven in a device such as a router as shown in FIG. 3, with a signal from a FPGA (field programmable gate array) 301, an ASIC (application specific integrated circuit), or the outside, for example, a signal from a digital circuit such as a TTL (transistor-transistor logic), an analog signal having a desirable voltage amplitude is generated using an electronic circuit such as a digital-analog converting circuit or an operational amplifier. For example, as shown in FIG. 3, with a signal from a FPGA 301, using buffers $302_N$ (N is a natural number), and drivers $303_N$ (N is a natural number), an analog signal having a desirable voltage amplitude is generated. When the N×N optical switch and the driving circuit are mounted on a PCB (Printed Circuit Board), the number of the terminals required to be independently voltage controlled is the foregoing number. The electronic circuit size necessarily becomes large, so that the physical distance between the optical switch and the driving circuit requires at least several to several tens centimeters. On the other hand, for switching an optical packet having a high-speed bit rate of 100 Gbit/s, high-speed On/Off switching of 1 ns or less is demanded. Namely, a switching signal having a bandwidth of about 1 GHz is required to be transmitted from the FPGA 301 to the optical switch 304. However, with the distance of several tens centimeters, actually, handling as a lumped parameter circuit is difficult. For this reason, mounting as a distributed parameter circuit with the characteristic impedance (e.g., 50Ω) of the transmission path to the optical switch 304 matched with the impedance of the optical switch is conceivable.

As the related art technology, for example, the optical switch as in PTL 1 is proposed. FIG. 4 shows a conventional optical switch driving structure. FIG. 4(a) is a view for illustrating the operation of the driving circuit at the time of optical signal blocking and FIG. 4(b) is a view for illustrating the operation of the driving circuit at the time of optical signal passing. The LVDS (low voltage differential signaling) signal from the FPGA is terminated at a LVDS terminating circuit 401, and an optical switch $D_{11}$ is driven by an inverter circuit 402 using a transistor $T_{11}$. The LVDS transmission line 403 is a distributed parameter line, and can control the transistor $T_{11}$ from the LVDS terminating circuit 401, thereby driving the optical switch $D_{11}$. In PTL 1, the optical switch $D_{11}$ and the driving circuit including the transistor $T_{11}$ are integrated. For this reason, the distance between the driving circuit and the control element of the optical switch $D_{11}$ is short, and can be handled as a lumped constant. For this reason, high-speed switching is possible.

CITATION LIST

Patent Literature

[PTL 1] Japanese Patent Application Publication No. 2016-218297

Non Patent Literature

[NPL 1] T. Watanabe, et. al., "Silica-based PLC 1×128 thermo-optic switch" 27th European Conference on Optical Communication (ECOC), 2001, Vol. 2, pp. 134-135.

SUMMARY OF THE INVENTION

In the optical switch shown in FIG. 2, when a MZI is used for the 2×2 optical switch $201_N$ (N is a natural number), and an EAM is used for the optical gate $202_N$ (N is a natural number), the MZI and the EAM operate at reverse biases. For this reason, signals having positive and negative opposite polarities are required to be given from a driving circuit (driver). The MZI and the EAM are required to be controlled at the same time, and hence the PFGAs or the like of the generator of a control signal become equal. However, drivers for applying positive and negative opposite signals are individually required. For this reason, the area involved in optical switch driving including the power supply necessary for the drivers increases in scale. When the distance from a driver $304_N$ (N is a natural number) to the control terminal of the optical switch 304 increases, as shown in FIG. 3, the reduction of the switching speed due to the deterioration of the electric waveform is feared. Further, when another power supply or the like is required as an individual driving driver, the power consumption increases, which is not preferable.

In the present disclosure, in view of the foregoing problem, it is an object to provide an optical switch technology capable of high-speed and low-power consumption driving due to the high-density integration of the drivers with respect to the MZI and the EAM controllable through the distributed parameter line from the FPGA.

A 1×N optical switch in accordance with the present disclosure is a 1×N optical switch having a structure in which with respect to an optical switch, a driving circuit of the optical switch is integrated in the vicinity of a control electrode of the optical switch. The optical switch is characterized by including a plurality of 2×2 optical switches and N optical gates, and is characterized in that different bias voltages ($V_b$) are set between the 2×2 optical switch and the optical gates, and a driver for the 2×2 optical switch of the driving circuit and a driver for the optical gate are of the same circuit form.

A 1×N optical switch in accordance with the present disclosure is a 1×N optical switch having a structure in which with respect to an optical switch, a driving circuit of the optical switch is integrated in the vicinity of a control electrode of the optical switch. The optical switch is characterized by including a plurality of 2×2 optical switches and N optical gates, and is characterized in that a power supply voltage ($V_d - V_s$) of a driver for the 2×2 optical switch of the driving circuit and a power supply voltage of a driver for the optical gate are equal.

In the optical switch in accordance with the present disclosure, the configuration of the same FPGA and the same driving circuit enables driving control. For this reason, an optical switch which can be driven at a high speed and a low power consumption is provided. Further, using a LVDS signal with a small amplitude and a low power consumption, the optical switch can be directly driven, and individual power supply, or the like is not required for the MZI and the EAM. For this reason, driving at a low power consumption is possible.

DESCRIPTION OF EMBODIMENTS

Below, an optical switch in an embodiment of the present invention will be described by reference to the accompanying drawings.

Figure 5:
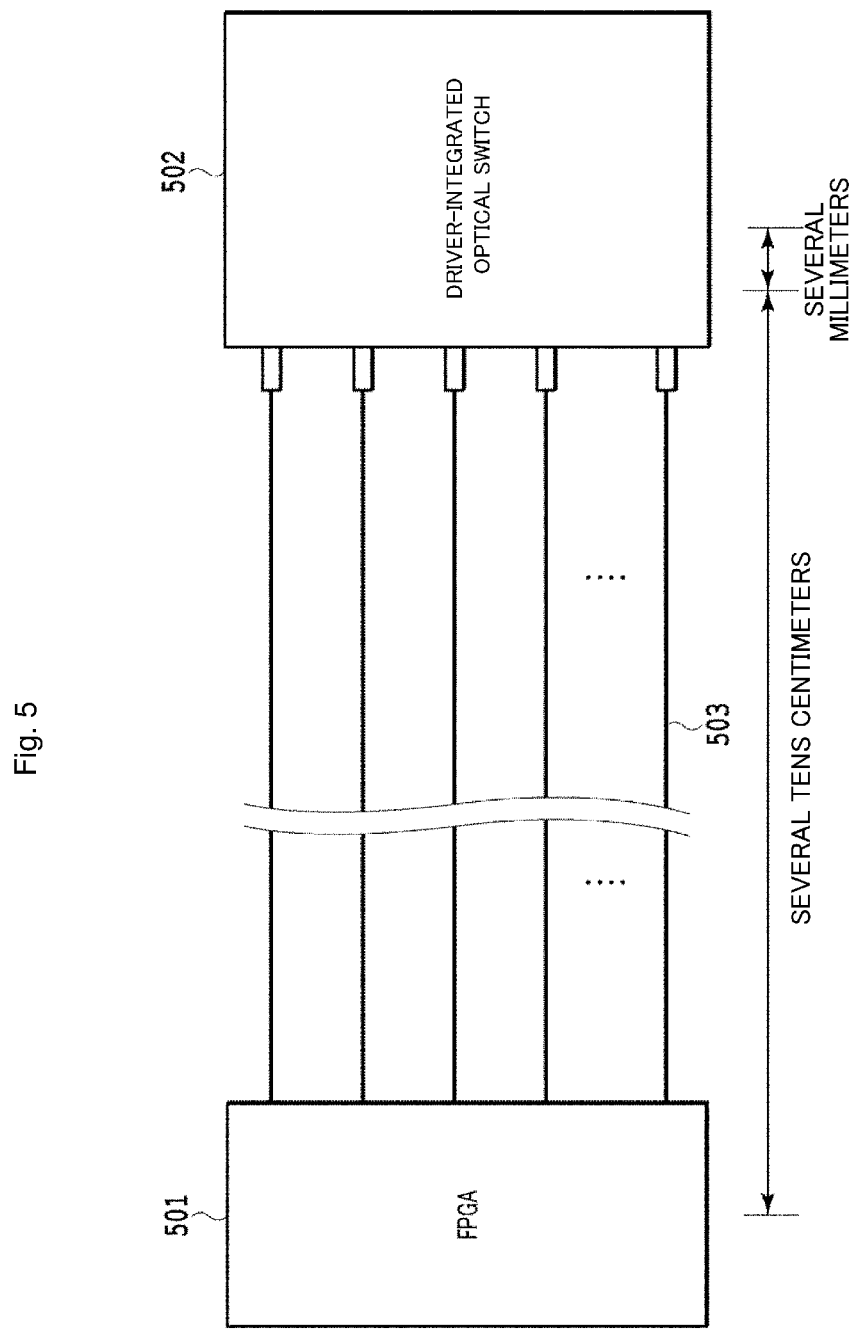
FIG. 5 is a view showing the structure of the optical switch in an embodiment of the present invention and the driving circuit of the optical switch.

FIG. 5 shows the optical switch driving structure in the present embodiment. As the optical switch driving driver, a driving circuit using a High Electron Mobility Transistor (HEMT) capable of implementing a high-speed voltage amplification circuit is used. As the form of a driver-integrated type optical switch 502, the structure is adopted in which for the optical switch, the driving circuits thereof are integrated in a high density in the vicinity of the control electrode of the optical switch. The integrated type may be implemented by integration onto the same InP substrate, or flipchip mounting or the like of individually manufactured optical switch chips and driver chips. In the present embodiment, using a LVDS transmission line 503 of a differential signal system using two transmission paths as an example of the distributed parameter line, the driver-integrated type optical switch 502 is operated. This operation enables high-speed signal transmission up to several GHz, low power consumption (3.5 mA driving, signal amplitude 350 mV), and high noise resistance (the same phase noise is cancelled by a differential signal).

Figure 6:
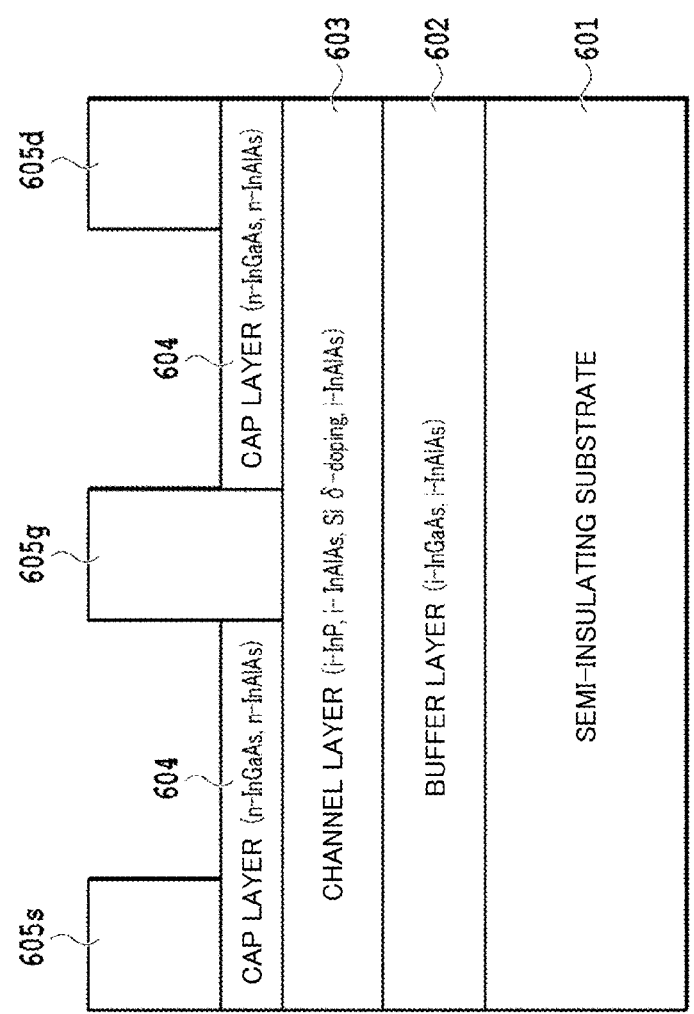
FIG. 6 is a cross sectional view showing the layer structure of a HEMT in accordance with an embodiment of the present invention.

The layer structure of the HEMT for use in the present embodiment is shown in FIG. 6. On a semi-insulating (semi insulator: SI) substrate 601, as a buffer layer 602, for example, an i-InAlAs-containing layer, and an i-InGaAs-containing layer on the i-InAlAs-containing layer are formed. As a channel layer 603, for example, from the lower layer, an i-InAlAs-containing layer, a Si δ-doped layer, an i-InAlAs-containing layer, and an i-InP-containing layer are sequentially formed. A structure is manufactured in which on the channel layer 603, a gate electrode 605g is formed, and a source electrode 605s and a drain electrode 605d are formed via a cap layer 604 including an n-InAlAs-containing layer, and an n-InGaAs-containing layer on the n-InAlAs-containing layer stacked therein. With the HEMT in accordance with the present embodiment, the gate length is set at 0.1 µm, and the gate width is set at 25 µm. The design values become important parameters for determining the characteristics of the HEMT. The gate length determines the response speed of the HEMT. However, it is known as follows: with a gate length of 0.1 µm as in the present embodiment, the operation in response to a high speed signal up to GHz is implemented. Further, it is possible to determine the value of the current flowing between the source and the drain according to the size of the gate width.

Figure 1:
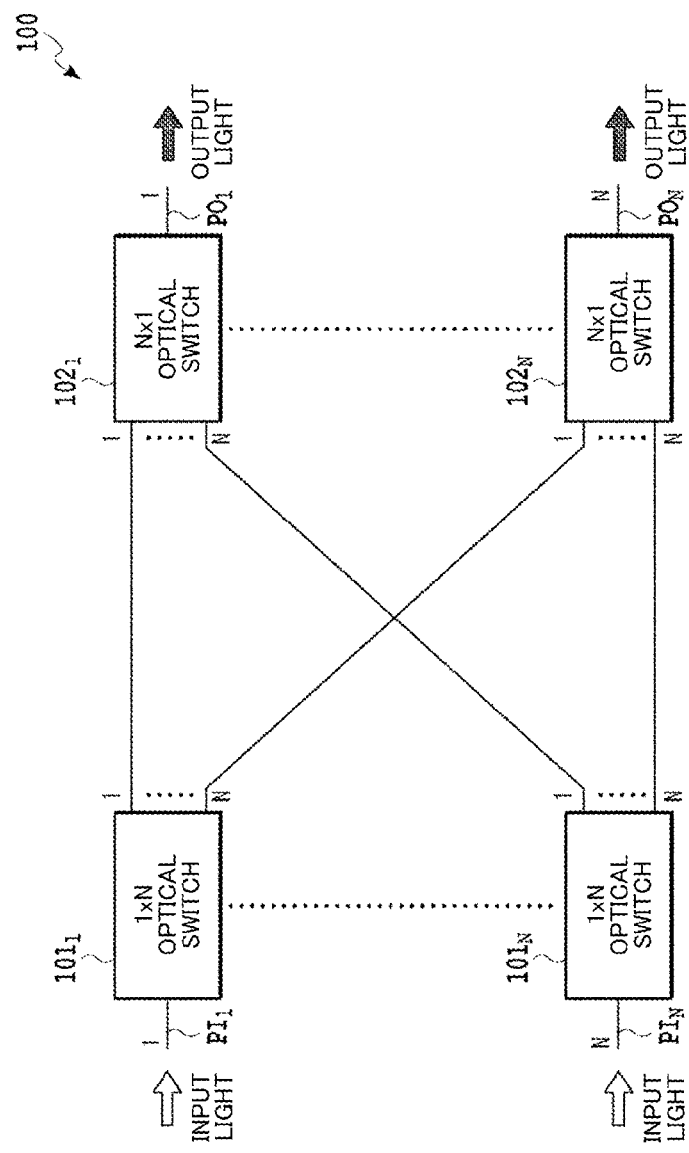
FIG. 1 is a view showing a configuration of an N×N optical switch.
Figure 2:
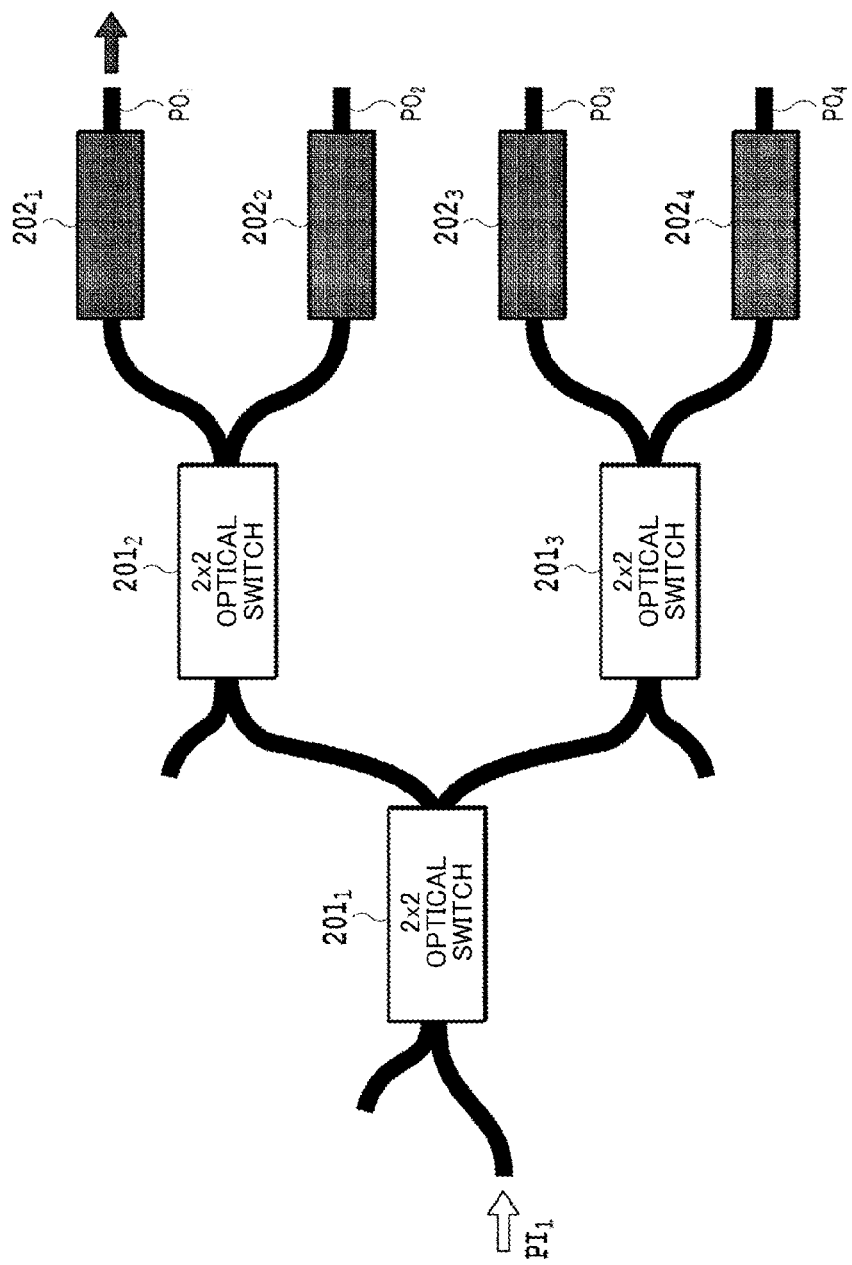
FIG. 2 is a view showing a configuration in which the 2×2 optical switches are arranged in a tree shape, and an optical gate is provided at each of N optical outputs.
Figure 3:
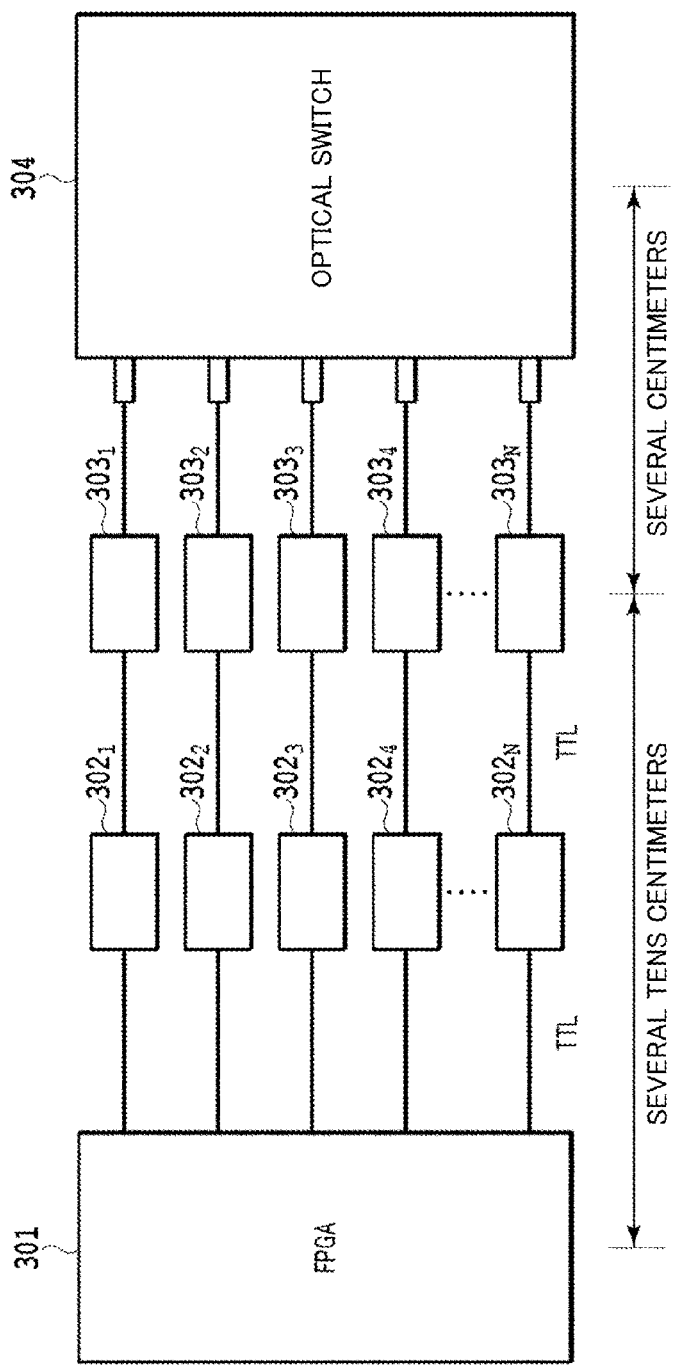
FIG. 3 is a view showing a structure of a conventional optical switch, and a driving circuit of the optical switch.
Figure 4A:
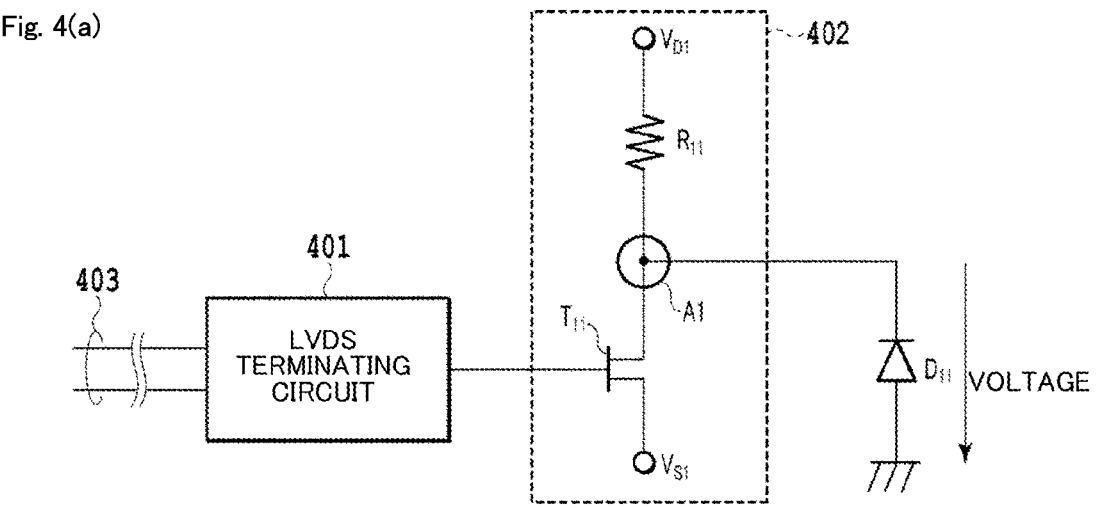
FIG. 4(a) is a view for illustrating the operation of the driving circuit at the time of signal light blocking.
Figure 4B:
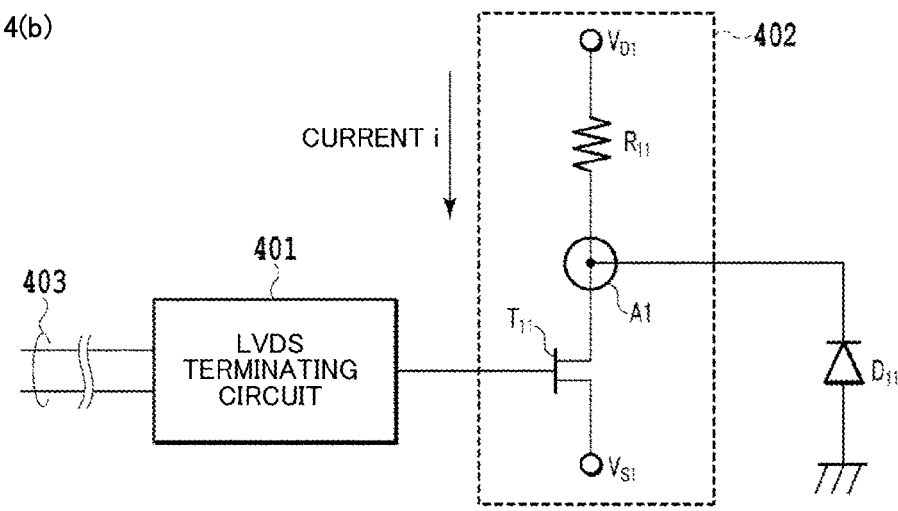
FIG. 4(b) is a view for illustrating the operation of the driving circuit at the time of signal light passing.

The optical switch structure is assumed to be the same as that shown in FIG. 2. The structure is adopted in which the 2×2 optical switches $201_N$ using a MZI or the like are connected in a multistage, and an optical gate $202_N$ is provided at the final stage.

Figure 7:
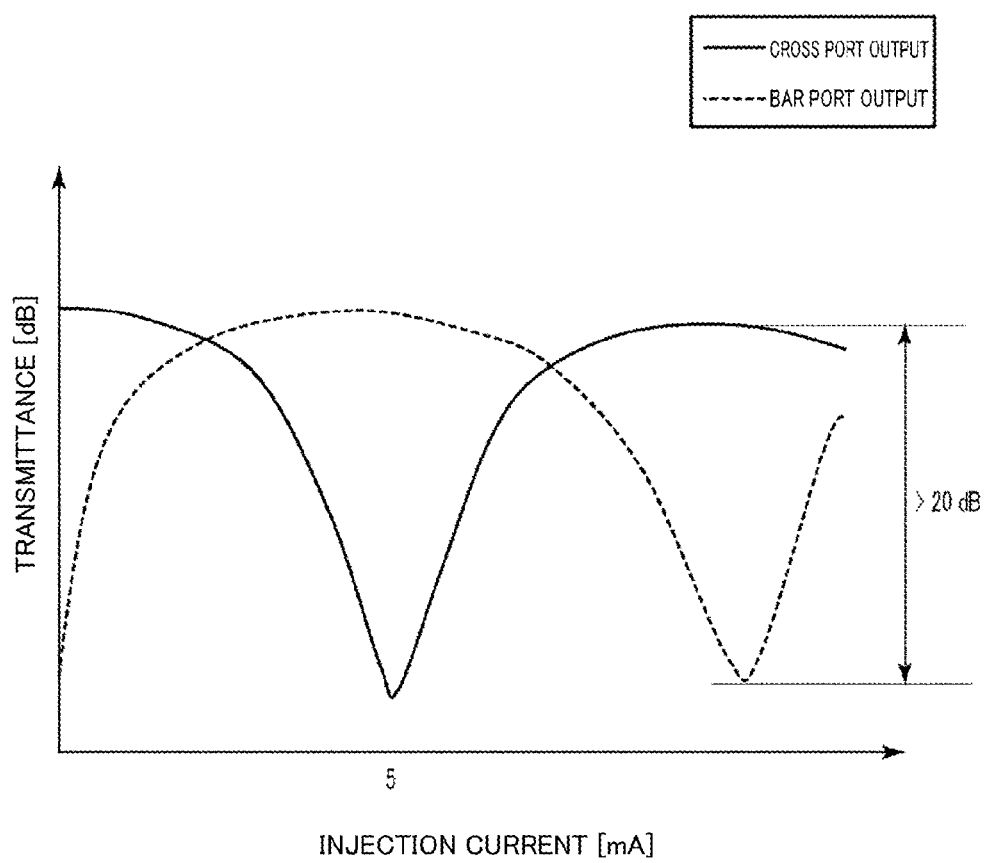
FIG. 7 is a graph showing the transmittance with respect to the injection current of a 2×2 MZI for use in an embodiment of the present invention.

The operation of the optical switch of the MZI will be described. Using a Multi-Mode Interference (MMI) type optical coupler with respect to an input light, two optical waveguides are multiplexed, and then branched into two optical waveguides. The two branched input lights undergo two waveguide phase difference, and then are coupled using the MMI optical coupler again. Then, due to the interference effect, when the phase difference between the two optical waveguides is $\pm n\pi$, the light is output from the optical waveguide opposite to the light input, and when the phase difference is $\pm(2n+1)\pi/2$, light is output from the optical waveguide on the same side as that of the light input. Therefore, when a phase modulation area is arranged in one optical waveguide, and is controlled, the 2×2 switching operation can be obtained. In order to obtain phase modulation, it is essential only that the refractive index of the optical waveguide is changed. With an InP type optical waveguide, using the FK effect or the QCSE effect due to voltage application, or the plasma effect due to current injection, the refractive index of the optical waveguide is changed. With the LN type, using the Pockels effect due to voltage application, the refractive index of the optical waveguide is changed. As a result, a switching operation can be performed. Alternatively, for the MMI optical coupler for halving the optical strength, a directional coupler, or the like may be used. When the injection current to the two arm optical waveguides is 0 mA, the input optical signal is output to the cross port side of the 2×2 switch. As shown in FIG. 7, when a current is injected to any one control electrode (the control electrode set on the waveguide forming the MZI), the refractive index of the arm optical waveguide to which the current has been injected changes, so that the phase of the propagating light changes. When the injection current to the arm optical waveguide becomes about 5 mA, the output from the optical output port $PO_1$ is minimized, and the optical output to the optical output port $PO_2$ is maximized. At this step, a ratio of the optical output to the optical output port $PO_1$ and the optical output to the optical output port $PO_2$ of 20 dB or more can be obtained.

Figure 8:
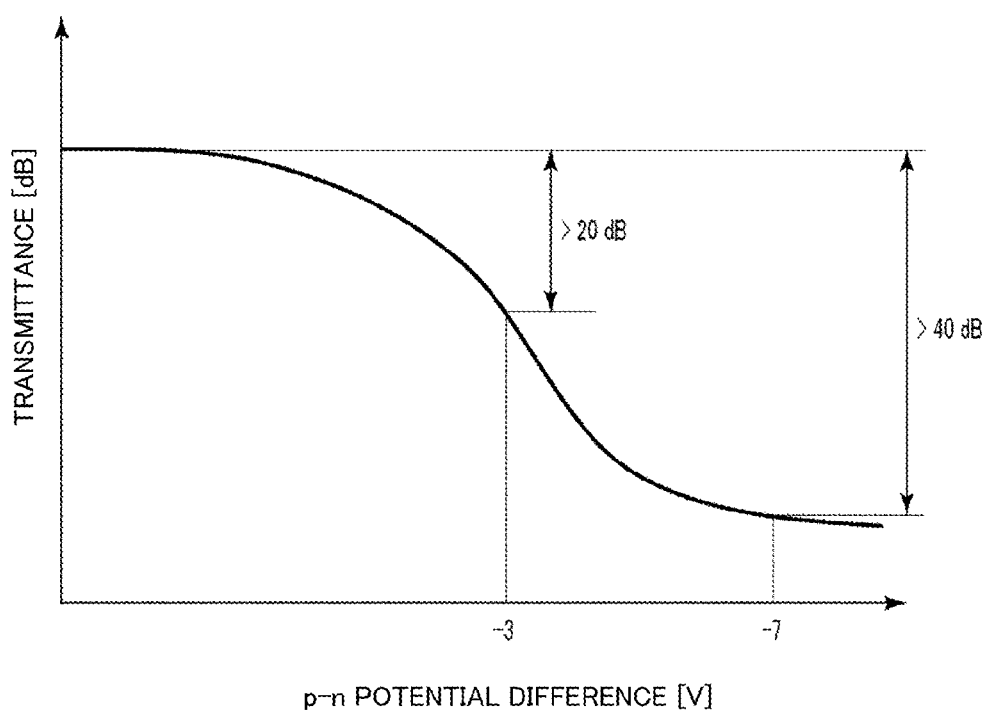
FIG. 8 is a graph showing the transmittance with respect to the injection voltage of an optical absorption gate for use in an embodiment of the present invention.

The operation of the optical gate $202_N$ will be described. At the optical gate $202_N$ provided at the final stage of the 2×2 optical switch $202_N$, blocking of the leaked light whose output is not desired is performed. With switching of the 2×2 optical switch, while most of the light is guided to a desirable port, a part of the light is leaked to different ports. The leaked light deteriorates the quality of the transmission signal, and hence is required to be minimized. In the case of the optical gate using the EAM of InP, a reverse bias voltage is applied between the p type electrode and the n type electrode. As a result, due to the Franz-Keldysh (FK) effect, the absorption end of the waveguide core is shifted, so that the absorption coefficient of the light propagating through the optical gate can be increased. As shown in FIG. 8, for example, when the application voltage is −3 V, an extinction ratio of 20 dB or more can be obtained. When the application voltage is −7 V, an extinction ratio of 40 dB or more can be obtained. As the optical gate $202_N$, a SOA which can be implemented by the same InP material, or the like may be used.

Figure 9:
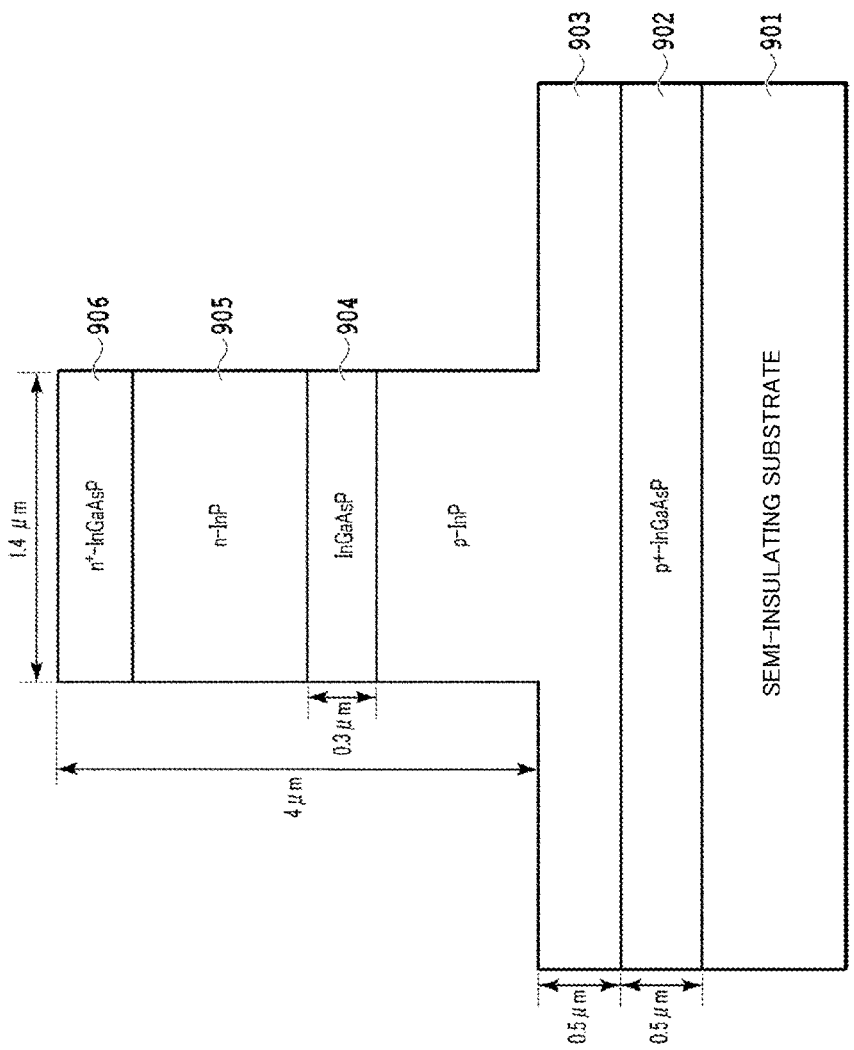
FIG. 9 is a cross sectional view showing an optical waveguide forming an element of the optical switch in accordance with an embodiment of the present invention.

FIG. 9 shows the cross sectional structure of the waveguide. The waveguide forming the optical switch was manufactured by etching to the underlying portion of the InGaAsP-containing core layer 904, resulting in a deep ridge waveguide having a pin double hetero junction structure. The height of the waveguide was set at 4 µm, and the width thereof was set at 1.4 µm. A conventional optical switch is normally manufactured on an n substrate. In contrast, in the present embodiment, an optical switch is manufactured on a SI substrate, thereby isolating the substrate potentials of the MZI and the EAM. With the optical switch on an n substrate, the substrate back surface was the common electrode. However, by manufacturing an optical switch on a SI substrate with a high resistivity, insulation and isolation become possible.

A method for manufacturing an optical switch in accordance with the present embodiment will be described.

First, for example, on a SI-InP-containing semi-insulating substrate 901, five layers of an $n^+$-InGaAsP-containing contact layer 902, an n-InP-containing lower cladding layer 903, a 1.4Ω composition 0.3 µm thick bulk i-InGaAsP-containing core layer 904, a P-InP-containing upper cladding layer 905, and a p'-InGaAsP-containing contact layer 906 are formed by growth by the Metal Organic Vapor Phase Epitaxy (MOVPE). Then, by photolithography and dry etching, a deep ridge waveguide structure is formed all together, thereby forming a trench reaching the SI substrate between the MZI area and the EAM area. Subsequently, Benzocyclobutene (BCB) of an organic material capable of being buried in a local area, and excellent in planarization is coated by spin coating, and is etched back until the substrate surface is exposed by RIE (Reactive Ion Etching) using an $O_2/C_2F_6$ mixed gas, thereby planarizing the surface of the substrate. Then, by photolithography and dry etching, a well for forming an electrode for ground electrode is manufactured, and an n type electrode is formed. Finally, on the optical gate, a p type electrode is formed. As described up to this point, it becomes possible to perform MOVPE growth and the formation of the optical waveguide structure all together.

In the present embodiment, the 0.3 µm thick, 1.4 µm wide, and 1.4Ω composition InGaAsP-containing layer is used. The design values become the important parameters for determining the optical characteristics of the optical switch. In order to implement the operation at an input signal optical wavelength of, for example 1.53 µm to 1.57 µm, and a low loss, high speed, and low power consumption operation, the following conditions are preferably satisfied.

First, the thickness of the InGaAsP-containing core layer 904 preferably falls within the range of 0.1 µm to 0.4 µm, of the single mode guiding condition with respect to the input signal light, and the condition having sufficient light confinement to the InGaAsP-containing core layer 904.

Secondly, the width of the InGaAsP-containing core layer 904 desirably falls within the range of 0.8 µm to 3 µm, of the single mode guiding condition with respect to the input signal light.

Thirdly, from the viewpoint of reducing the power consumption of the driving circuit, desirably, the condition is such that the application voltage to the optical gate is 7 V or less, and the composition of the InGaAsP-containing core layer 904 is 1.3Ω to 1.5Ω, and each electrode length falls within the range of 100 μm to 2000 μm.

Although a description has been given that, for the optical switch in the present embodiment, as the InGaAsP-containing core layer of the optical gate $202_N$, the bulk layer is used, a multiple quantum well structure may be adopted. In that case, it becomes possible to perform quenching with high efficiency at the optical gate due to the Quantum Confined Stark Effect. Further, although the optical waveguide structure is set as a ridge waveguide structure, the optical waveguide structure may be manufactured as other structures, for example, a deep ridge type optical waveguide structure. Alternatively, a buried type optical waveguide structure in which both sides of the InGaAsP-containing core layer 904 are buried with a semiconductor, a rib type optical waveguide structure, or the like is also acceptable.

Although a description has been given using the InP type compound semiconductor in the present embodiment, a GaAs type compound semiconductor may be used. Alternatively, even using a material type capable of a change in refractive index and absorption coefficient of the nanosecond order such as a silicon wire waveguide, the present invention can be implemented similarly.

EXAMPLE

Figure 10:
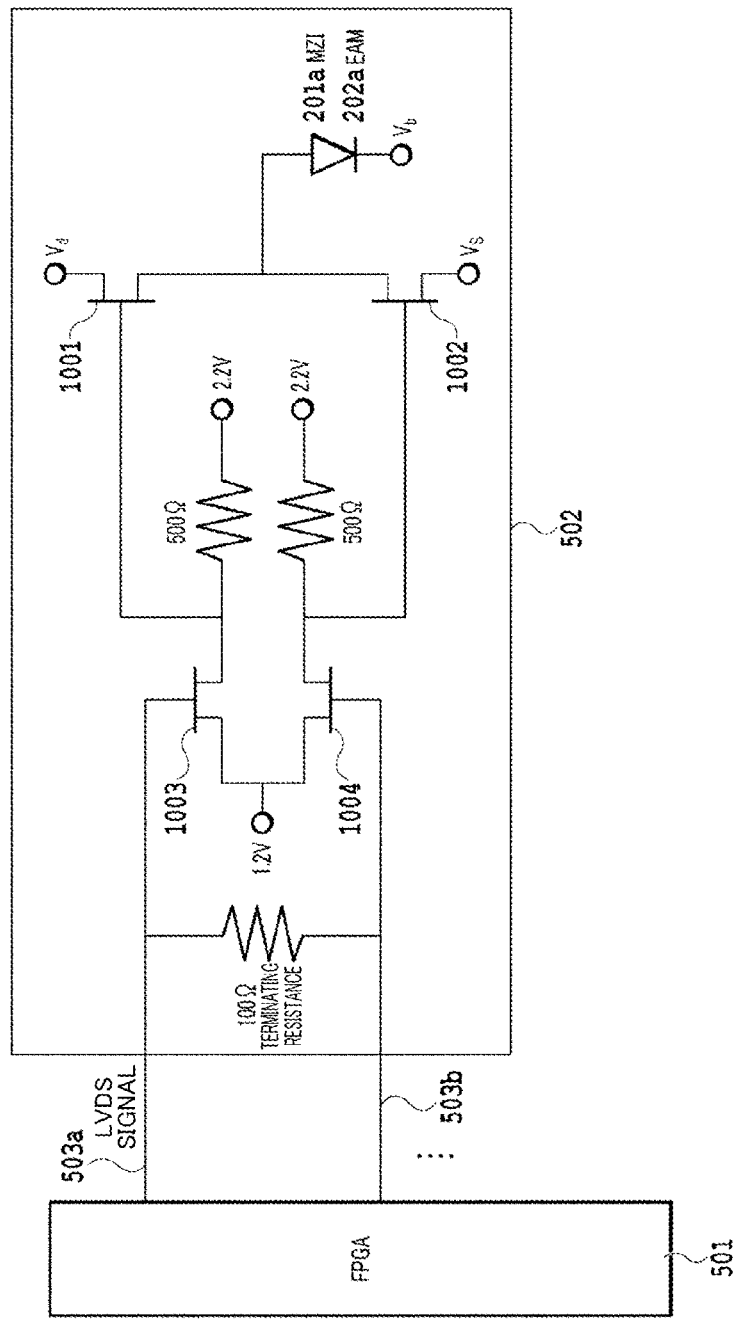
FIG. 10 is a view showing the structure of an optical switch in accordance with Example of the present invention, and the driving circuit of the optical switch.

FIG. 10 shows an example of an optical switch in accordance with Example of the present invention and the driving circuit thereof.

The configuration of the driving circuit will be described by reference to FIG. 10. A FPGA 501 is connected to a first LVDS transmission line 503a and a second LVDS transmission line 503b. The first LVDS transmission line 503a is connected to the gate of the transistor 1003 and one terminal of the terminating resistance. The drain of the transistor 1003 is connected to the gate of the transistor 1001 and one terminal of the resistance. Whereas, the second LVDS transmission line 503b is connected to the gate of the transistor 1004 and the other terminal of the terminating resistance.

The drain of the transistor 1004 is connected to the gate of the transistor 1002 and one terminal of the resistance. At the other terminal of the resistance, Vdd (2.2 v) is provided, and at the sources of the transistor 1003 and the transistor 1004, Vss (1.2 v) is provided. With the middle point between the transistor 1001 and the transistor 1002 as a totem-pole output, a MZI 201a and an EAM 202a are applied with a voltage.

The drain voltage $V_d$, and the source voltage $V_s$ at the HEMT of the driving circuit can be set for every driving circuit. The signal from the FPGA 501 having an amplitude common to the MZI 201a and the EAM 202a is input to the driver-integrated type optical switch 502 by the LVDS transmission line 503. $V_b$ represents the bias potential of each n type electrode in the MZI and the EAM of the optical switch. From the structure of the optical switch shown in FIG. 9, the MZI and the EAM are individually manufactured, thereby enabling setting of different $V_b$'s between the MZI and the EAM. This enables driving at the common FPGA and driver circuit.

The operation of the driving circuit will be described by reference to FIG. 10.

A LVDS signal is a differential signal with an amplitude of 350 mV centered on 1.2 V. When the gate of the transistor 1003 is applied with 1.375 V, the gate of the transistor 1004 is applied with 1.025 V. At this step, the gate of the transistor 1001 is opened, and the gate of the transistor 1002 is closed. A current flows between the source and the drain of the transistor 1001, and the optical switch is applied with a voltage of $V_d$. On the other hand, when the gate of the transistor 1003 is applied with 1.025 V, the gate of the transistor 1004 is applied with 1.375 V. At this step, the gate of the transistor 1001 is closed, and the gate of the transistor 1002 is opened. A current flow between the source and the drain of the transistor 1002, the optical switch is applied with a voltage of $V_s$. Thus, by switching the LVDS differential signal, opening/closing of the transistor 1001 and the transistor 1002 is performed, thereby switching the voltage to be applied to the optical switch. As a result, the switching operation is implemented.

For example, in the driving circuit of a MZI 201a, it is set that $V_d$=3 V, and $V_s$=1 V. In the case where $V_b$=1 V is applied, when the gate of the transistor 1001 is opened by the signal from the FPGA 501, the MZI 201a is applied with a potential difference of 2 V in the positive direction, allowing a current to flow therethrough. When the gate of the transistor 1002 is opened, a potential difference is not caused at the MZI 201a. For this reason, a current does not flow. Opening/closing of the gates of the transistor 1001 and the transistor 1002 adjusts the current of the MZI, thereby enabling switching of the output port.

On the other hand, in the driving circuit of the EAM 202a, it is set that $V_d$=4.5 V, and $V_s$=1 V. In the case where $V_b$=4.5 V is applied, when the gate of the transistor 1001 is opened by the signal from the FPGA 502, a potential difference is not caused at the EAM 202a. For this reason, optical quenching is not performed. When the gate of the transistor 1002 is opened, a potential difference of 3.5 V is generated in the negative direction with respect to the EAM 202a. For this reason, quenching is performed. Opening/closing of the gates of the transistor 1001 and the transistor 1002 enables opening/closing of the gate of the EAM 202a.

The present embodiment provides a 1×N optical switch having a structure in which with respect to an optical switch, a driving circuit of the optical switch is integrated in the vicinity of a control electrode of the optical switch. The optical switch includes a plurality of 2×2 optical switches and N optical gates. Different bias voltages ($V_b$) are set between the optical switch and the optical gates, and a driver for the 2×2 optical switch of the driving circuit and a driver for the optical gate are of the same circuit form.

Further, the present embodiment provides a 1×N optical switch having a structure in which with respect to an optical switch, a driving circuit of the optical switch is integrated in the vicinity of a control electrode of the optical switch. The optical switch includes a plurality of 2×2 optical switches and N optical gates. A power supply voltage ($V_d$–$V_s$) of a driver for the 2×2 optical switch of the driving circuit and a power supply voltage of a driver for the optical gate are equal.

In the 1×N optical switch, the MZI and the EAM are individually manufactured, thereby enabling setting of different $V_b$'s between the MZI and the EAM. This enables control using the configuration of the same FPGA and the same driving circuit. For this reason, high density integration of the driving circuits becomes possible, so that the high speed operation of the optical switch is implemented. Further, using a LVDS signal with a small amplitude and a low power consumption, the optical switch can be directly driven, and individual power supply, or the like is not required for the MZI and the EAM. For this reason, driving at a low power consumption is possible.

INDUSTRIAL APPLICABILITY

The present disclosure is applicable to a technical field of an optical switch element of an important optical component for supporting a large capacity optical communication network.

The invention claimed is:

1. A 1×N optical switch having a structure in which with respect to an optical switch, a driving circuit of the optical switch is integrated in a vicinity of a control electrode of the optical switch,
   the optical switch comprising 2×2 optical switches and N optical gates,
   wherein the 2×2 optical switches are different than the N optical gates,
   wherein the driving circuit includes a driver for each of the 2×2 optical switches and a driver for each of the N optical gates;
   wherein a first bias voltage ($V_b$) is set to the 2×2 optical switches and different a second bias voltage ($V_b$) is set to the N optical gates, and
   a circuit form for the driver for each of the 2×2 optical switches and a circuit form for a driver for each of the N optical gates are the same.

2. The 1×N optical switch according to claim 1,
   wherein the 2×2 optical switches include Mach-Zehnder interferometers (MZI), and
   the optical switch has a structure in which a plurality of 2×2 MZIs including an electrode for applying a voltage or a current to each of two waveguides of the MZI are arranged in a multistage, and is characterized by a structure in which one of two input ports of the 2×2 MZI at a latter stage is connected to each of two output ports of the 2×2 MZI at a previous stage in a tree shape.

3. The 1×N optical switch according to claim 1, wherein each of the N optical gates is an electric field absorbing type optical gate.

4. The 1×N optical switch according to claim 1, wherein the optical switch and the driving circuit are integrated on a same substrate.

5. The 1×N optical switch according to claim 1, wherein the optical switch and the driving circuit are integrated by flipchip mounting.

6. The 1×N optical switch according to claim 1, further comprising:
   a distributed parameter line to be connected with the driving circuit; and
   a FPGA to be connected with the distributed parameter line,
   wherein as a control signal of the optical switch to be input to the driving circuit, a LVDS (Low Voltage Differential Signaling) signal from the FPGA (Field Programmable Gate Array) is used.

7. The 1×N optical switch according to claim 6, wherein a terminating circuit for terminating the LVDS signal from the FPGA; and the driving circuit are configured to drive the 2×2 optical switch and the N optical gates, wherein the driving circuit transistors having a deep ridge waveguide structure.

8. A 1×N optical switch having a structure in which with respect to an optical switch, a driving circuit of the optical switch is integrated in a vicinity of a control electrode of the optical switch,
   the optical switch comprising 2×2 optical switches and N optical gates,
   wherein the 2×2 optical switches are different than the N optical gates,
   wherein the driving circuit includes a driver for each of the 2×2 optical switches and a driver for each of the N optical gates, and
   wherein a first power supply voltage ($V_d$) and a second power supply voltage ($V_s$) for the drivers for the 2×2 optical switches are equal, respectively, to a first power supply voltage ($V_d$) and a second power supply voltage ($V_s$) of the drivers for the N optical gates.

9. The 1×N optical switch according to claim 8,
   wherein the 2×2 optical switches include, a Mach-Zehnder interferometers (MZI), and
   the optical switch has a structure in which a plurality of 2×2 MZIs including an electrode for applying a voltage or a current to each of two waveguides of the MZI are arranged in a multistage, and is characterized by a structure in which one of two input ports of the 2×2 MZI at a latter stage is connected to each of two output ports of the 2 ×2 MZI at a previous stage in a tree shape.

10. The 1×N optical switch according to claim 8, wherein each of the N optical gates is an electric field absorbing type optical gate.

11. The 1×N optical switch according to claim 8, wherein the optical switch and the driving circuit are integrated on the a same substrate.

12. The 1×N optical switch according to claim 8, wherein the optical switch and the driving circuit are integrated by flipchip mounting.

13. The 1×N optical switch according to claim 8, further comprising:
   a distributed parameter line to be connected with the driving circuit; and
   a FPGA to be connected with the distributed parameter line,
   wherein as a control signal of the optical switch to be input to the driving circuit, a LVDS (Low Voltage Differential Signaling) signal from the FPGA (Field Programmable Gate Array) is used.

14. The 1×N optical switch according to claim 13, wherein a terminating circuit for terminating the LVDS signal from the FPGA and the driving circuit are configured to drive the 2×2 optical switch and the N optical gates, wherein the driving circuit includes transistors having a deep ridge waveguide structure.

* * * * *